United States Patent [19]

Herzog

[11] Patent Number: 5,191,723
[45] Date of Patent: Mar. 9, 1993

[54] APPARATUS AND METHOD FOR RECOVERING SPENT LIME FOR USE AS A NUTRITIONAL FLOWING AGENT FOR POULTRY AND ANIMAL FEEDS

[75] Inventor: William E. Herzog, St. Joseph, Mo.

[73] Assignee: Herzog Contracting Corporation, St. Joseph, Mo.

[21] Appl. No.: 639,195

[22] Filed: Jan. 9, 1991

[51] Int. Cl.$^5$ .............................................. F26B 7/00
[52] U.S. Cl. ........................................ 34/12; 34/136; 34/32; 34/60; 432/16
[58] Field of Search ................. 34/22, 136, 137, 138, 34/60, 82, 85, 12, 13, 32; 432/215, 14, 16; 426/635

[56] References Cited

U.S. PATENT DOCUMENTS

| | | |
|---|---|---|
| 3,895,117 | 7/1975 | Backlund . |
| 3,983,255 | 9/1976 | Bass . |
| 4,040,190 | 8/1977 | van den Broek ................ 34/11 |
| 4,144,355 | 3/1979 | Rawlings et al. . |
| 4,252,831 | 2/1981 | Gleckler et al. . |
| 4,376,343 | 3/1983 | White et al. ................ 34/136 X |
| 4,479,978 | 10/1984 | Robertiello et al. . |
| 4,560,561 | 12/1985 | Henderson et al. . |
| 4,761,893 | 8/1988 | Glorioso . |
| 4,860,671 | 8/1989 | Glonioso ................ 34/11 |

*Primary Examiner*—Henry A. Bennett
*Attorney, Agent, or Firm*—Litman, McMahon & Brown

[57] ABSTRACT

An apparatus and method to recover spent lime from various manufacturing processes, such as sugar manufacturing from sugar beets and sugar cane, for use as a nutritional flowing agent for poultry and animal feeds, comprises a first holding bin for receiving expended lime cake from a lime lagoon, a second holding bin for receiving expended lime cake from dewatering stockpiles, a rotary kiln dryer, a cyclone dust collector, a negative-air-pressure dust collector, and a product storage bin. As the lime cake is processed through the rotary kiln dryer, the lime cake is dried at a temperature having an upper limit such that the nutritive value of the lime cake is not destroyed. In the kiln, a substantial portion of the lime cake is converted to dust particles suspended in air, which air is directed through one or both of the collectors to collect and remove the suspended particles therefrom. The lime cake which does not become air-borne in the rotary kiln dryer is, nevertheless, mechanically broken down into its constituent particles. Conveyors transport the finished, dried, particulate lime with its nutrients from the kiln and from the collectors to the product storage bin for further distribution.

14 Claims, 1 Drawing Sheet

Microfiche Appendix Included
(051920056 Microfiche, Bennett; Henry A. Pages)

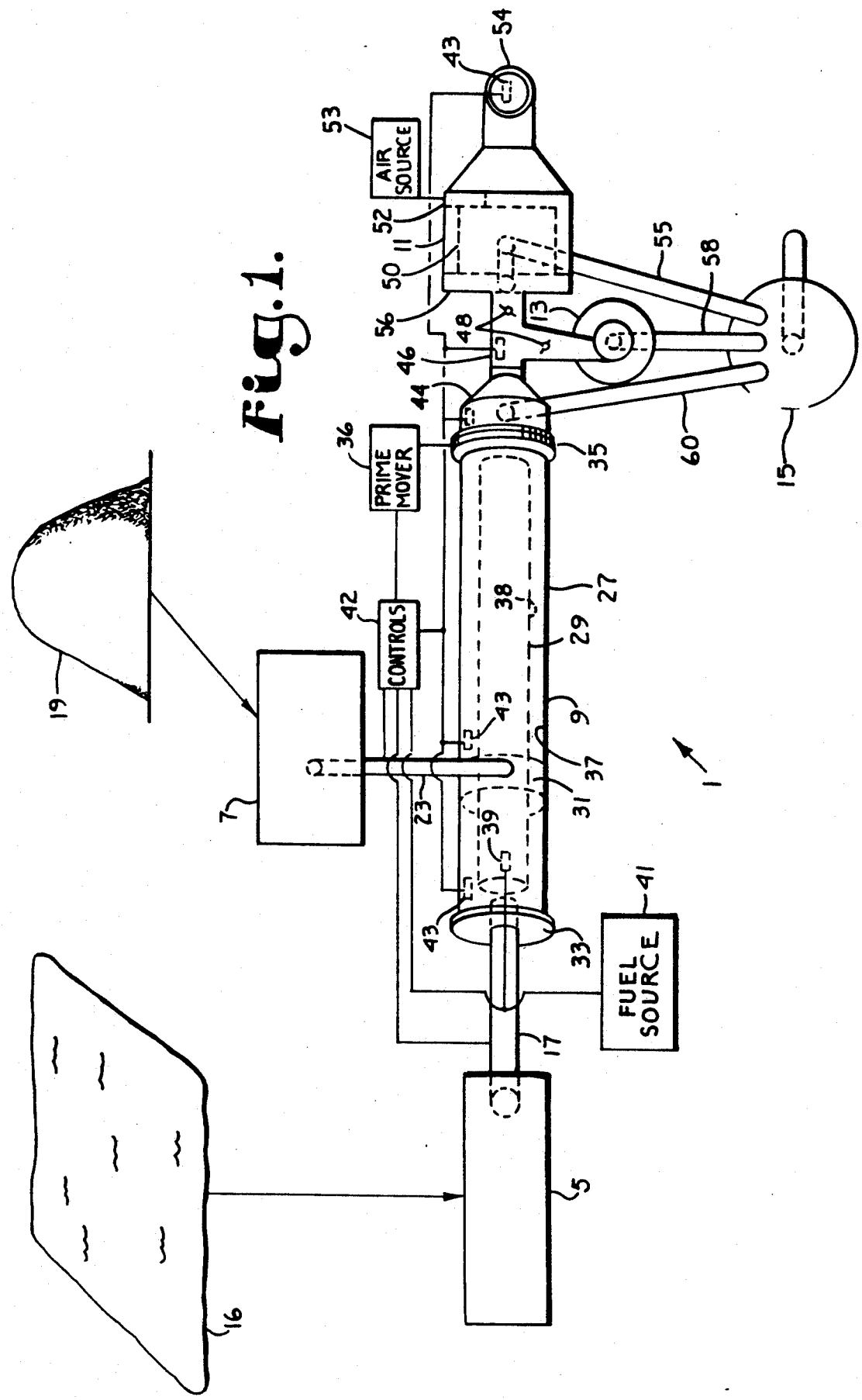

APPARATUS AND METHOD FOR RECOVERING SPENT LIME FOR USE AS A NUTRITIONAL FLOWING AGENT FOR POULTRY AND ANIMAL FEEDS

FIELD OF THE INVENTION

The present invention relates to an apparatus and a method for the recovery of valuable lime from various manufacturing processes for use as a flowing agent and nutritional supplement for poultry feeds and animal feeds.

BACKGROUND OF THE INVENTION

Various types of feeds, such as poultry feeds and animal feeds, tend to agglomerate rather than remain divided into relatively small particles such as pellets, which are readily ingestible without further processing just prior to distributing such feeds for their intended purposes. It is well known in the art that the addition of certain powdery materials as a "flowing agent" to such feeds before such agglomeration occurs will generally promote retention of non-agglomerated particles. The flowing agents are effective because they comprise fine particulate matter and tend to remove excess moisture and oil from the meal particles which would otherwise promote agglomeration. Such flowing agents are useful for most types of feeds, including oilseed meals manufactured from soybeans, sunflowers, flax, canola, and the like.

The flowing agent additives, such as those added to soy bean meal, include bentonite, finely ground limestone, low quality clay or dirt products, and the like. While most of these flowing agent additives generally comprise approximately 0.5-5 per cent by weight of the feeds to which they are added, such flowing agents usually have negligible nutritional value.

Fortunately, a substantial source of waste materials exists from manufacturing sugar from sugar beets and sugar cane, which are capable of not only providing flowing agents for poultry and animal feeds but which have nutritional value and which provide an opportunity to recapture otherwise productive land which has fallen into disuse from the discarding of such waste materials.

Sugar is generally obtained from sugar beets or sugar cane. The manufacturing process generally involves sequentially washing and slicing the raw sugar beets or the sugar cane, followed by boiling in water. The resulting pulp mixture is then pressed to extract sugar juice from the pulp. The next step is to remove impurities from the sugar juice. This is generally accomplished by blending the sugar juice with a thick slurry, commonly referred to in the industry as "milk-a-lime". The milk-a-lime is produced by calcining high quality, high calcium content limestone in a lime kiln fired with petroleum coke to produce hydrated lime.

Two different processes have been used to utilize the milk-a-lime slurry to remove the impurities. The older process involves blending the slurry with the sugar beet juice and reincorporating the carbon dioxide driven off by the calcining process into the resultant mixture. The mixture of sugar juice and milk-a-lime is then diverted through a centrifuge filter which effectively separates the sugar water from the milk-a-lime, with the latter retaining substantially all of the impurities. The lime slurry is then transported to either a roll filter or a frame and grate press with the remaining lime residue then mixed with fresh water to form a mixture containing 18-30% solids, which is then sluiced out to a dewatering pond or lagoon where it typically sits for at least two years.

In a newer process, the lime slurry, after passage through the filter or the frame and grate press, is processed through a rinsing cycle to remove additional sugar from the lime. The resulting mixture, which is dewatered to 25-30% solids, contains less sugar, less protein, and is drier than the residue obtained from the older process, is generally conveyed to a dewatering stockpile.

Careful analysis has disclosed that approximately 98% of the particles contained in such solids will pass through a 200-mesh sieve and 95% will pass through a 325-mesh sieve, which is a size distribution range which is substantially similar to that observed for other flowing agents used for animal and poultry feeds. However, a significant attribute of such solids is that they typically comprise not only substantial amounts of calcium but also comprise carbohydrates and other nutrients (approximately 3%), both of which provide essential ingredients for animal feeds and poultry feeds. Although lime cake obtained from the newer process has fewer carbohydrate and other nutrients due to the extra rinsing cycle, the particulate size distribution range of both processes is substantially similar. Moisture content of lime cake generally ranges from 18-30%, with the lime cake obtained from the lime lagoons usually having a higher moisture content than that obtained from the dewatering stockpiles.

What is needed is an apparatus and a method whereby the spent lime in the lime lagoons and in the dewatering stockpiles can be made productive as a nutritional flowing agent for animal and poultry feeds and thereby also freeing up the associated underlying land for productive uses.

SUMMARY OF THE INVENTION

An apparatus and method are provided for recovering spent lime from lime cake discarded from manufacturing processes, such as sugar manufacturing, for use as a nutritional flowing agent for poultry and animal feeds. The apparatus includes a first storage bin for receiving spent lime cake obtained from dewatering lagoons, a second storage bin for receiving spent lime cake obtained from dewatering stockpiles, a rotary kiln dryer, a cyclone collector and/or a negative-air-pressure collector, and a product storage bin.

The rotary kiln dryer includes a rotating outer shell and a smaller inner drum affixed thereto. A burner spaced near one end of the rotary kiln dryer operably maintains the temperature inside the rotary kiln dryer within a desired range. An upper limit to such temperature range must be observed if destruction of certain nutrients contained in the lime cake is to be avoided.

Lime cake is conveyed from the first storage bin to an input end of the rotary kiln dryer and deposited within the rotary kiln dryer. The input end of the rotary kiln dryer is generally elevated higher than the output end of the rotary kiln dryer, such that flights rigidly secured to the inside surface of the outer shell gravitationally urge the lime cake deposited in the rotary kiln dryer from the input end to the output end thereof.

Similarly, lime cake is conveyed from the second storage bin to the rotary kiln dryer. However, since the lime cake contained in the second storage bin is obtained from dewatering stockpiles which generally have a lower moisture content than lime cake obtained from lime lagoons and therefore does not require as much residence time in the kiln dryer, when lime cake from both a lagoon and a dewatering stockpile is simultaneously fed into the rotary kiln dryer, the lime cake from the second storage bin is deposited through a flop-gate entry collar spaced near a mid-point of the rotary kiln dryer. When cake is obtained from only one of either the lagoon or the stockpile, the cake may be deposited either at the input end of the rotary kiln dryer or through the flop-gate entry collar as desired.

As the lime cake contained in the rotary kiln dryer is tumbled and urged therealong by the flights of the rotating outer shell, a substantial portion of such lime cake is converted to dust which becomes suspended in the air contained in the rotary kiln dryer. Such dust-laden air is extracted from the rotary kiln dryer and diverted by dampers to the cyclone dust collector and/or to the negative-air-pressure dust collector. Dust collected in the cyclone collector is then pneumatically or mechanically conveyed to the product storage bin for further distribution.

A filter bag arrangement collects dust diverted to the negative-air-pressure dust collector. A reversing, pulsing arrangement periodically removes the dust collected by the filter bag arrangement. Settled dust collected in an impax or knock-out box of the negative-air-pressure collector is combined with the dust collected by the filter bag arrangement and is conveyed to the product storage bin.

Lime cake which is not converted to dust suspended in the air extracted from the rotary kiln dryer is, nevertheless, reduced to its particulate structure by the tumbling and drying action in the rotating drum and is removed near the output end of the rotary dryer and conveyed to the product storage bin for further distribution.

OBJECTS OF THE INVENTION

Therefore, the principal objects of the present invention are: to provide an apparatus and a method to recover discarded spent lime from manufacturing processes, such as the manufacturing of sugar from sugar beets and sugar cane, for use as a nutritional additive for production of poultry and animal feeds; to provide such an apparatus and method to recover discarded spent lime from such manufacturing processes for use as a nutritional flowing agent for production of poultry and animal feeds; to provide such an apparatus and method to recapture otherwise productive land which has fallen into disuse due to such discarded spent lime; to provide such an apparatus and method to process such spent lime without destroying carbohydrate and other nutrients therein; to provide such an apparatus which can be configured in either a permanent or a portable configuration; to provide such an apparatus and method for simultaneously recovering discarded spent lime from lime lagoons and from dewatering stockpiles; and to generally provide such an apparatus and method which are efficient, reliable, economical, and perform the purposes intended.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a partially schematic top plan view of an apparatus for recovering spent lime for use as a nutritional flowing agent for poultry and animal feeds in accordance with the present invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The present invention is directed to an apparatus and a process for recovering spent lime from sugar manufacturing processes, generally designated by the reference numeral 1, for use as a nutritional flowing agent for production of poultry and animal feeds. The apparatus 1 comprises a first storage or holding bin 5, a second storage or holding bin 7, drying means and separating means, such as a rotary kiln 9, dust collecting means, such as a negative-air-pressure dust collector 11 and a cyclone dust collector 13, and product storage means, such as a silo or finished product storage bin 15, as shown schematically in the Figure.

It is to be understood that the apparatus 1 can be used as a permanently installed facility at a fixed location, or as a portable facility mounted on semi-trailer units, or the like, for transportation to various spent lime sites. For some applications, it may be necessary to install the apparatus 1 in an enclosed structure to maintain efficient ambient conditions.

The first holding bin 5, such as a plurality of 9'×13' cold feeder bins having a startup control panel and having feeding and collecting belts, as provided by Kolberg, or the like, is constructed to contain spent lime calcium carbonate cake which has been excavated from a dewatering pond or lagoon 16 used for holding such lime cake after being discarded from a manufacturing process, such as that associated with the older processes used for sugar beet and sugar cane manufacturing operations. The bin 5 also is constructed to discharge such lime cake contained therein onto a conveyor 17.

The second holding bin 7, such as a Model PF225 25-ton feeder bin having air gates and having feeding and collecting belts as provided by CMI, or the like, is constructed to receive spent lime calcium carbonate cake obtained from a dewatering stockpile 19 used for holding such lime cake after being discarded from a manufacturing process, such as that associated with the newer processes used for sugar beet and sugar cane manufacturing operations. The bin 7 is constructed to discharge such lime cake contained therein onto a conveyor 23.

The dryer kiln 9, such as a Model DA70 rotary dryer kiln as provided by Barber Greene, or the like, includes an outer shell 27, an inner drum 29 and a mid-section 31, such as a flop-gate entry collar, or the like. The outer shell 27 is generally cylindrically shaped with an input end 33 thereof being elevated higher than an output end 35 thereof. Similarly, the inner drum 29 is cylindrically shaped and is coaxially aligned with, and affixed to, the outer shell 27.

The outer shell 27 is mounted on a trunion (not shown) by means commonly known in the art such that the outer shell 27 and the inner drum 29 can be rotated axially, such as by a suitable prime mover 36. The outer shell 27 includes elongate ribs or flights (not shown) rigidly secured to an inner surface 37 thereof to slowly gravitationally urge and transport solid materials from the input end 33 of the outer outer shell 27 is rotated. Similarly, the drum 27 includes elongate ribs or flights (not shown) rigidly secured to an outer surface 38 thereof to sometimes assist with slowly urging and transporting solid materials from the input end 33 to the output end 35 of the outer shell 27 as the outer shell 27 and the drum 29 are rotated.

The conveyor 17 is constructed to receive lime cake discharged by the first holding bin 5 and thereafter transport the lime cake to the dryer kiln 9 such that the lime cake is deposited within the outer shell 27 near the input end 33 thereof.

The conveyor 23 is constructed to receive lime cake discharged from the second holding bin 7 and transport such lime cake to the mid section 31 and thereafter gravitationally deposit such lime cake onto the surface 38 and into the outer shell 27. The mid section 31 is adapted to mechanically divert such lime cake such that it is contained within the outer shell 27 by means commonly provided by rotary kiln dryers readily available in the industry.

A burner 39, such as a combination oil and gas burner, or the like, is generally spaced near the axis of the rotary kiln dryer 9 such that an elevated temperature can be maintained within both the outer shell 27 and the drum 29. One purpose for the inner drum 29 is to prevent the flame from the burner 39 from coming in contact with, or radiating heat too rapidly to, the lime cake being processed through the rotary kiln dryer 9. However, for some applications of the present invention, the inner drum 29 may not extend the entire length of the outer shell 27, but may extend only for a short distance from the input end 33; or, for some applications, the inner drum 29 may be entirely eliminated.

For applications where it is important to avoid thermal destruction of nutrients in the lime cake, the maximum preferable temperature of materials processed through the apparatus 1 is approximately 230 degrees F. The burner 39 is fed by a vapor-type fuel, such as natural gas, propane, butane, or other suitable fuel, from a fuel source 41 as required by the burner 39. The temperature and moisture is monitored by a control system 42 and appropriately spaced sensors 43, which automatically adjust the burn rate of the burner 39 and the throughput of cake processed through the apparatus 1 in order to maintain the desired operational characteristics of the apparatus 1.

Alternatively, the burner 39 may be similarly installed and fueled but placed near the output end 35 of the dryer kiln 9 (not shown) such that the direction of combustion from the burner 39 is opposite to the direction of travel of cake through the kiln 9.

A cowling 44 and a duct 46 are adapted to extract air containing suspended particulate lime cake from the cavity of the rotary kiln dryer 9 and direct that air to either or both of the negative air pressure collector 11 and the cyclone dust collector 13. Directing means, such as a pair of dampers 48 control the relative volume of air directed to each of the collectors 11 and 13.

The negative-air-pressure collector 11, which includes a filter bag arrangement 50, such as a Model T76 Baghouse Dust Collector having approximately 1200 filter bags, each approximately 4.5 inch diameter by 8 ft. in length for handling approximately 76,000 ACFM of dust-laden air at a continuous operating temperature of 300 degrees F., or the like, is constructed to receive the elevated temperature, dust-laden air from the kiln 9. Pulsing means, such as Model CEMA 12 pulsing equipment with an air source 53, such as clean dry air at a minimum rate of approximately 200 CFM and at a pressure of approximately 100–110 psig, remove the collected dust from the interior walls of the filter bag arrangement 50.

The negative-air-pressure dust collector 11 includes an exhaust stack 54 for releasing the air obtained from the rotary kiln dryer 9, after the particulate lime cake has been filtered therefrom by the negative-air-pressure collector 11, into the atmosphere.

A conveyor 55 is constructed to receive the dust removed from the interior of the filter bag arrangement 50 and then pneumatically or mechanically transport that dust to the product storage bin 15.

Dust-laden air traveling from the duct 46 into the negative-air-pressure collector 11 is subjected to a substantial reduction in velocity, causing a substantial portion of the dust contained in the air to settle in a knockout or impax region 56 of the negative-air-pressure collector 11. The dust collected by the impax 56 is conveyed, such as by augers (not shown), or the like, such that the dust from the impax 56 is similarly transported to the product storage bin 15 by the conveyor 55.

The cyclone dust collector 13, such as a Model CA-70-R cyclone dust collector as provided by Barber Greene, or the like, operates in parallel with the negative-air-pressure dust collector 11. For some applications, it may be desirable to alternatively connect the cyclone dust collector 13 between the negative-air-pressure dust collector 11 and the rotary kiln dryer 9 whereby the cyclone dust collector 13 and the negative-air-pressure collector 11 operate in a series configuration (not shown).

A conveyor 58 is constructed to receive the dust collected by the cyclone dust collector 13 and then pneumatically or mechanically transport that dust to the product storage bin 15.

Also, a conveyor 60 is constructed to gravitationally receive solids tumbling from the output end 35 of the outer shell 27 and then pneumatically or mechanically transport those solids to the product storage bin 15.

In an application of the present invention, lime cake is excavated from the lagoon 16, taking care to avoid scooping up underlying soil therewith. The lime cake is then conveyed by suitable means, such as trucks, conveyors, or the like, and deposited in the holding bin 5. Similarly, lime cake is removed from the stockpile 19 and deposited in the holding bin 7. It is to be understood that for those applications where lime cake, either from a lagoon or from a stockpile but not both, is processed, either the holding bin 5 or the holding bin 7 may be used to receive the lime cake from whichever source, with the other bin, 7 or 5, not required for those applications.

The burner 39 is fired and the temperature in the rotary kiln dryer 9 is elevated as desired. Preferably, a maximum temperature of approximately 230 degrees F. is used for processing lime cake which contains desired nutrients. For those applications not requiring the preservation of the nutrients, substantially higher temperatures may be utilized in order to obtain higher throughput as hereinafter described.

The lime cake from bin 5 is then continuously deposited into the input end of the outer shell 27. Generally, the rotary kiln dryer 9 rotates at a rate of approximately 5-10 rotations per minute. Flights rigidly secured to the inner surface 37 of the outer shell 27 mechanically elevate the lime cake and gravitationally drop it, thus obtaining more rapid drying of the lime cake and crumbling of the lime cake into its particulate constituents. As the lime cake is elevated and dropped, it gradually gravitationally works its way from the input end 33 of the outer shell 27 toward the output end 35 of the outer shell 27.

Similarly, the lime cake from bin 7 is continuously deposited through the outer shell 27 onto the rotating inner drum 29. Since the lime cake contained in bin 7 is taken from the stockpile 19, it has a lower moisture content than the lime cake in bin 5 which is taken from the lagoon 16. Thus, lime cake from bin 7 does not require as much residence time in the rotary kiln dryer 9 as does lime cake from bin 5. As a result, the lime cake from bin 7 is deposited in the rotary kiln dryer 9 at the mid-section 31 instead of near the input end 33.

As the lime cake progresses through the rotary kiln dryer 9, the moisture content of the lime cake is substantially reduced to approximately 3-5 percent. A substantial portion of the particulate lime cake becomes airborne and becomes suspended in the air above the lime cake tumbling along the bottom of the outer shell 27.

The quantity throughput rate of the apparatus 1 approximately ranges from 40-150 tons of lime cake per hour. The throughput time for processing lime cake through the rotary kiln dryer 9 ranges from approximately 3-10 minutes, preferably approximately 6 minutes. The throughput time of lime cake which does not become air-borne is controlled by the rate at which the rotary kiln drye: The actual throughput time is dependent upon several variables, including the temperature of the lime cake as it is deposited in the rotary kiln dryer 9, the quantity throughput rate, and the effective temperature maintained in the rotary kiln dryer 9. Temperature and moisture monitoring devices 43 in conjunction with the controls 42 are used to automatically control throughput time and quantity.

The dampers 48 are used to direct the air-borne lime cake particles to one or both of the dust collectors 11 and 13. When both of the collectors 11 and 13 are used, the dampers 48 are further used to control the relative quantity of dust-laden air directed to each of the dust collectors 11 and 13.

The non-air-borne particulate matter, which is received by conveyor 60, and the particulate matter which is airborne until collected by the collectors 11 and 13 and received by the conveyors 58 and 55 respectively, is the finished product ready for distribution from the product storage bin 15.

The recovered spent lime product obtained by use of the present invention provides an economically produced additive which should lower the cost of poultry and animal feeds, thus reducing the production costs for farmers and food costs to consumers. This product has high nutritive value due to its significant levels of protein, carbohydrates, calcium, magnesium, manganese, zinc and other trace minerals which are essential for animal nutrition.

In addition to its nutritive value, the recovered spent lime product provides a valuable addition to most oilseed meals, such as soybeans, sunflowers, flax and canola due to its use as a flowing agent by absorbing moisture from freshly processed meals resulting from the extraction of oil from the seeds.

Another attribute of the recovered spent lime product provided by the present invention is its applicability to the mixed formula feed industry for livestock and poultry. In that application, steam is generally added to feed ingredients in preparation for pelleting. By the use of the recovered spent lime product provided by the present invention as a component of such feed mixes, grains having higher moisture content can be used. As a result, the high cost of pre-drying of such grains can be substantially reduced or eliminated. In addition, the recovered spent lime product can then be applied directly to the hot pellets as a dusting agent. In so doing, substantial savings are realized because of the elimination of cooling systems and cooling time previously required in order to prevent the hot moist pellets from sticking and caking together.

Other applications for the particulate lime obtained from the present invention include manufacturing of paint, manufacturing of glass, and use as a fluxing agent for the manufacturing of steel from iron ore.

It is to be understood that while certain forms of the present invention have been illustrated and described herein, it is not to be limited to the specific forms or arrangement of parts described and shown.

What is claimed and desired to be secured by Letters Patent is as follows:

1. A method for recovering spent lime cake from sugar beet and sugar cane manufacturing processes for use in animal feeds, the steps comprising:
   (a) thermally removing excess moisture from a mixture consisting essentially of spent lime from sugar beet and sugar cane manufacturing processes with a dryer;
   (b) mechanically breaking down said mixture into its particulate constituents such that some of said particulate constituents become air-borne and some of said particulate constituents remain non-air-borne;
   (c) directing said air-borne particulate constituents through a dust collector for collecting said air-borne particulate constituents;
   (d) conveying said non-air-borne particulate constituents from said dryer and said particulate constituents collected in said dust collector to a product storage bin; and
   (e) incorporating said particulate constituents as a dry additive to animal feed in sufficient quantity to function as a flowing agent.

2. The method according to claim 1 wherein step (1) includes partially thermally removing excess moisture from said lime cake followed by adding thereto additional lime cake having a lower moisture content, such that excess moisture is simultaneously removed from lime cake having substantially different moisture contents.

3. The method according to claim 1, wherein step (a) includes maintaining the temperature of the particulate lime cake emerging from the dryer below a certain maximum temperature to avoid destroying nutrients contained in said lime cake.

4. The method according to claim 3 wherein said maximum temperature is 230 degrees F.

5. The method according to claim 1 which includes the additional step of repeatedly elevating and dropping said lime cake as it is subjected to the thermal removal of excess moisture.

6. The method according to claim 1 which includes the additional step of repeatedly elevating and dropping said lime cake as it is subjected to the mechanical breaking down of said lime cake into its particulate constitutents.

7. The method according to claim 1 wherein step (c) includes collecting said air-borne lime cake particulate constituents by a cyclone dust collector.

8. The method according to claim 1 wherein step (c) includes collecting said air-borne lime cake particulate constituents by a negative-air-pressure dust collector.

9. The method according to claim 1 wherein step (c) includes collecting said air-borne lime cake particulate constituents by a cyclone dust collector and collecting the remainder of said air-borne lime cake particulate constituents by a negative-air-pressure dust collector.

10. The method according to claim 1 including the step of:
    (a) incorporating said constituents into poultry feed.

11. A method for processing a nutritive flowing agent for animal and poultry feeds, including the steps of:
    (a) providing a mixture comprising substantially entirely spent particulate lime cake from sugar beet and sugar cane manufacturing processes;
    (b) drying said mixture by removing excess moisture from said mixture;
    (c) separating said mixture into its particulate components by making at least a portion of said components airborne;
    (d) collecting said air-borne components; and
    (e) adding said collected components to said animal and poultry feeds.

12. A product by the method of claims 1 or 11.

13. An apparatus for recovering spent particulate lime cake from sugar beet and sugar cane manufacturing processes for use as a flowing agent, which comprises:
    (a) a drying means for removing excess moisture from the lime cake;
    (b) separating means for separating the lime cake into its particulate components;
    (c) dust collecting means for collecting air-borne particulate lime cake components; said dust collecting means including:
        (1) a cyclone dust collector for collecting the air-borne lime cake components;
        (2) a negative-air-pressure dust collector for collecting the air-borne lime cake components; said negative-air-pressure dust collector having a knock-out portion and a filter bag arrangement having a reversing, pulsing cleaning mechanism;
        (3) a cowling and duct for directing the air-borne lime cake components to said cyclone dust collector and to said negative-air-pressure dust collector; and
        (4) dampers to control the relative quantity of the air-borne lime cake components directed to said cyclone dust collector and said negative-air-pressure collector;
    (d) a finished product bin; and
    (e) conveyor means for receiving the particulate lime cake components from said separating means and from said dust collecting means and for transporting same to said finished product bin.

14. An apparatus for recovering spent particulate lime cake from a lime lagoon and a dewatering stockpile, from sugar beet and sugar cane manufacturing processes, comprising:
    (a) a first holding bin for receiving the lime cake from the lime lagoon;
    (b) a second holding bin for receiving the lime cake from the dewatering stockpile;
    (c) a rotary kiln dryer having a rotating shell, an inner drum, an entry collar mid-section, and a burner; said shell having an input end elevated above an output end thereof;
    (d) a first conveyor for receiving lime cake from said first holding bin and depositing same near an input end of said shell;
    (e) a second conveyor for receiving lime cake from said second holding bin and depositing same in said dryer entry collar mid-section;
    (f) a plurality of flights rigidly secured to an inner surface of said shell for gravitationally urging lime cake contained in said shell from the input end of said shell to the output end of said shell; said flights further tumbling the lime cake such that it is substantially mechanically broken down into its particulate constituents including the generation of dust suspended in the air contained in said rotary kiln dryer;
    (g) a plurality of flights rigidly secured to an outer surface of said drum for assisting with the gravitational urging of lime cake contained in said shell from the input end of said shell to the output end of said shell;
    (h) at least one sensor for monitoring the temperature and moisture of the lime cake at a selected location in said drum;
    (i) controls for adjusting the lime cake throughput characteristics of the dryer as provided by said sensor;
    (j) a cyclone dust collector for collecting the airsuspended, lime cake dust;
    (k) a negative-air-pressure dust collector; said negative-air-pressure dust collector having a filter-bag arrangement for collecting the air-suspended lime cake dust, a reversing pulsing mechanism for removing dust collected by said filter-bag arrangement, and a knock-out portion for collecting dust which settles out in said negative-air-pressure dust collector before entering said filter-bag arrangement;
    (l) a cowling and duct for directing the air-borne dust into said cyclone dust collector and said negative-air-pressure dust collector;
    (m) dampers for controlling the amount of the air-borne dust directed to said cyclone dust collector relative to the amount of the air-borne dust directed to said negative-air-pressure dust collector;
    (n) a product bin for containing the processed lime dust particulate constituents;
    (o) a third conveyor for receiving non-air-borne lime cake particulate constituents from said dryer and depositing same in said product bin;
    (p) a fourth conveyor for receiving the lime cake dust collected by said cyclone dust collector and depositing same in said product bin; and
    (q) a fifth conveyor for receiving the lime cake dust collected by said filter-bag arrangement and said knock-out portion of said negative-air-pressure dust collector and depositing same in said product bin.

* * * * *